United States Patent
Chen et al.

(10) Patent No.: US 10,468,169 B2
(45) Date of Patent: Nov. 5, 2019

(54) CO2 Z-TYPE FERRITE COMPOSITE MATERIAL FOR USE IN ULTRA-HIGH FREQUENCY ANTENNAS

(71) Applicant: ROGERS CORPORATION, Chandler, AZ (US)

(72) Inventors: Yajie Chen, Brighton, MA (US); Vincent Harris, Sharon, MA (US)

(73) Assignee: ROGERS CORPORATION, Chandler, AZ (US)

( * ) Notice: Subject to any disclaimer, the term of this patent is extended or adjusted under 35 U.S.C. 154(b) by 348 days.

(21) Appl. No.: 15/329,072

(22) PCT Filed: Jul. 31, 2015

(86) PCT No.: PCT/US2015/043075
§ 371 (c)(1),
(2) Date: Jan. 25, 2017

(87) PCT Pub. No.: WO2016/064459
PCT Pub. Date: Apr. 28, 2016

(65) Prior Publication Data
US 2017/0213628 A1    Jul. 27, 2017

Related U.S. Application Data

(60) Provisional application No. 62/031,369, filed on Jul. 31, 2014.

(51) Int. Cl.
H01F 1/37       (2006.01)
C04B 35/26     (2006.01)
(Continued)

(52) U.S. Cl.
CPC ........... *H01F 1/37* (2013.01); *C01G 49/0018* (2013.01); *C01G 49/0036* (2013.01);
(Continued)

(58) Field of Classification Search
CPC ........................... C04B 35/2633; H01F 1/348
See application file for complete search history.

(56) References Cited

U.S. PATENT DOCUMENTS 3,162,603 A    12/1964    Kohn et al.
5,593,612 A    1/1997    Lubitz
(Continued)

FOREIGN PATENT DOCUMENTS

CN    103304186 A    9/2013
GB    1105788 A    3/1968
(Continued)

OTHER PUBLICATIONS

Translation of Guo et al, "Magnetic Properties of Ir+4 Doped Co2 Z-Type Hexagonal Ferrites", Journal of Rare Earths, vol. 25, Supp. 2, Jun. 2007, pp. 220-222.*
(Continued)

*Primary Examiner* — C Melissa Koslow
(74) *Attorney, Agent, or Firm* — Cantor Colburn LLP

(57) ABSTRACT

A ferrite composition is provided containing Ba, Co, and Ir and having a Z-type hexaferrite phase and a Y-type hexaferrite phase. The ferrite composition has the formula $Ba_3Co_{(2+x)}Ir_xFe_{(24-2x)}O_{41}$ where $x=0.05$-$0.20$. The composition has equal or substantially equal values of permeability and permittivity while retaining low magnetic and dielectric loss factors. The composition is suitable for ultrahigh frequency applications such as high frequency and microwave antennas.

22 Claims, 8 Drawing Sheets

(51) Int. Cl.

| | | |
|---|---|---|
| *C04B 35/634* | (2006.01) | |
| *C01G 49/00* | (2006.01) | |
| *C01G 51/00* | (2006.01) | |
| *H01F 1/34* | (2006.01) | |
| *C04B 35/626* | (2006.01) | |
| *C04B 35/638* | (2006.01) | |
| *C04B 35/64* | (2006.01) | |

(52) U.S. Cl.
CPC ........ *C01G 51/006* (2013.01); *C04B 35/2633* (2013.01); *C04B 35/6262* (2013.01); *C04B 35/638* (2013.01); *C04B 35/63416* (2013.01); *C04B 35/64* (2013.01); *H01F 1/348* (2013.01); *C01P 2002/72* (2013.01); *C01P 2004/03* (2013.01); *C04B 2235/3215* (2013.01); *C04B 2235/3274* (2013.01); *C04B 2235/3275* (2013.01); *C04B 2235/3277* (2013.01); *C04B 2235/3289* (2013.01); *C04B 2235/3298* (2013.01); *C04B 2235/6567* (2013.01); *C04B 2235/6585* (2013.01); *C04B 2235/81* (2013.01); *C04B 2235/83* (2013.01); *C04B 2235/85* (2013.01); *C04B 2235/96* (2013.01)

(56) References Cited

U.S. PATENT DOCUMENTS

| | | | |
|---|---|---|---|
| 5,835,003 | A | 11/1998 | Nickel et al. |
| 6,358,432 | B1 | 3/2002 | Tomono et al. |
| 7,411,565 | B2 | 8/2008 | McKinzie, III et al. |
| 8,703,391 | B1 | 4/2014 | Dirk et al. |
| 8,758,721 | B2 | 6/2014 | Hill |
| 2009/0101873 | A1 | 4/2009 | Tan et al. |
| 2009/0266604 | A1 | 10/2009 | Tetsuji |
| 2009/0297432 | A1 | 12/2009 | Hill |
| 2013/0265205 | A1 | 10/2013 | Okano et al. |
| 2013/0342414 | A1 | 12/2013 | Hong et al. |
| 2014/0176380 | A1 | 6/2014 | Choi et al. |
| 2016/0099498 | A1 | 4/2016 | Pance et al. |
| 2016/0113113 | A1 | 4/2016 | Sethumadhavan et al. |
| 2016/0276072 | A1 | 9/2016 | Sethumadhavan et al. |
| 2018/0016157 | A1 | 1/2018 | Chen et al. |

FOREIGN PATENT DOCUMENTS

| | | |
|---|---|---|
| JP | 2000235916 A | 8/2000 |
| JP | 2000277973 A | 10/2000 |
| WO | 2012103020 A2 | 8/2012 |

OTHER PUBLICATIONS

Brando et al., "Microwave Electromagnetic Characteristics of New Substituted M-Hexaferrites BaFe12-2xAxMexO19 (A=Ru, Ir; Me=Co, Zn)", Journal De Physique IV France, Mar. 1997.

International Search Report; International Application No. PCT/US15/043075; International Filing Date Jul. 31, 2015; dated May 31, 2016; 4 pages.

Sharma et al.; "Ultra Low Loss Soft Magnetic Nanoparticles for Applications Up to S-band," Applied Physics Letters, vol. 103, 112402, Sep. 2013.

Su et el., "Low Loss Factor Co2Z Ferrite Composites with Equivalent Permittivity and Permeability for Ultra-high Frequency Applications," Applied Physics Letters, Aug. 2014, vol. 105 No. 062402.

Thakur et al, "Low-loss Spinel Nanoferrite with Matching Permeability and Permittivity in the Ultrahigh Frequency Range," Journal of Applied Physics • Aug. 2010, vol. 108.

Written Opinion; International Application No. PCT/US15/043075; International Filing Date Jul. 31, 2015; dated May 31, 2016; 5 pages.

Guo et al. "Magnetic Properties of Ir4+ Doped Co2 Z Type Hexagonal Ferrites," Journal of Rare Earths, pp. 220-222, vol. 25, Supplement 2, Jun. 2007.

Cao et al. "Hydrogen-Induced Lateral Growth of Nickel Coating on Ba3Co2Fe24O4 (Co2Z -Based Hexaferrite during the Electroplating of Multilayer Chip Inductors," Journal of the Electrochemical Society, 2002, vol. 149 Issue 12, pp. J89-J92.

Haijun et al., "The preparation and microwave properties of Ba3ZnzCo2-zFe24O41 ferrite by citrate sol-gel process", Materials Science and Engineering, B84, 2001, pp. 252-257.

Lee et al. "Role of Small Permeability in Gigahertz Ferrite Antenna Performance," IEEE Magnetics Letter, 2013, vol. 4.

Lee et al., "Low Loss Co2Z (Ba3Co2Fe24O41)—Glass Composite for Gigahertz Antenna Application," Journal of Applies Physics, 2011, vol. 109, 07E530-2.

Lee, Jaejin, et al., "Role of Small Permeability in Gigahertz Ferrite Antenna Performance", IEEE Magnetics Letters, vol. 4., (Jan. 1, 2013) p. 5000104; 4 pgs.

Martin et al.; "Flexible Magnetic Composites"; Passive RF Component Technoloby, Materials Techniques and Applications; Chapter 8; 2012; pp. 156-185.

Mu et al., "Improvement of high-frequency characteristics of Z-type hexaferrite by dysprosium doping", Journal of Applied Physics, 109, 123925, 2011, 6 pages.

Wu et al.; "Studies of high-frequency magnetic permeability of rod-shaped CrO2 nanoparticles"; Phys. Stat. Sol. (a) 204; No. 3; pp. 755-762; 2007.

Xu et al., "Structural, dielectric and magnetic properties of Nd-doped Co2Z-type hexaferrites", Jounal of Alloys and Compounds, 509, 2011, pp. 4290-4294.

* cited by examiner

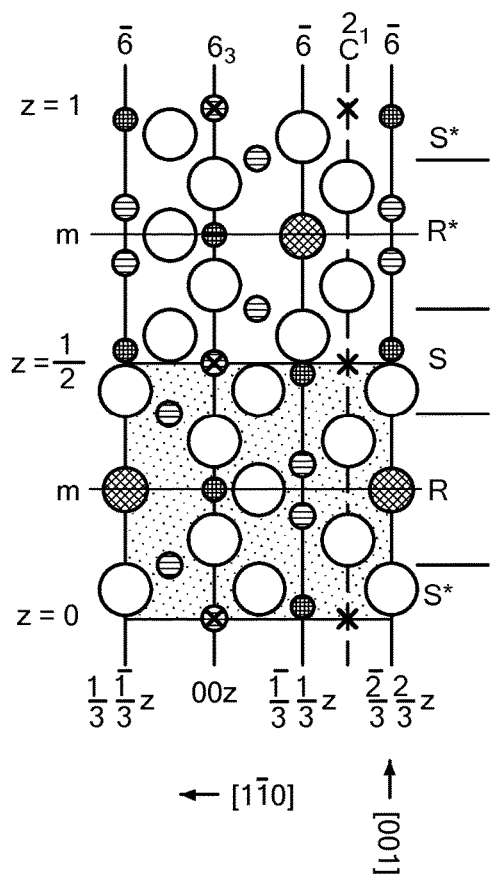
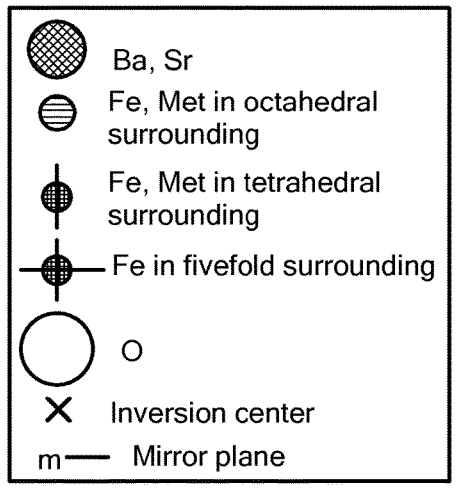
FIG. 1A
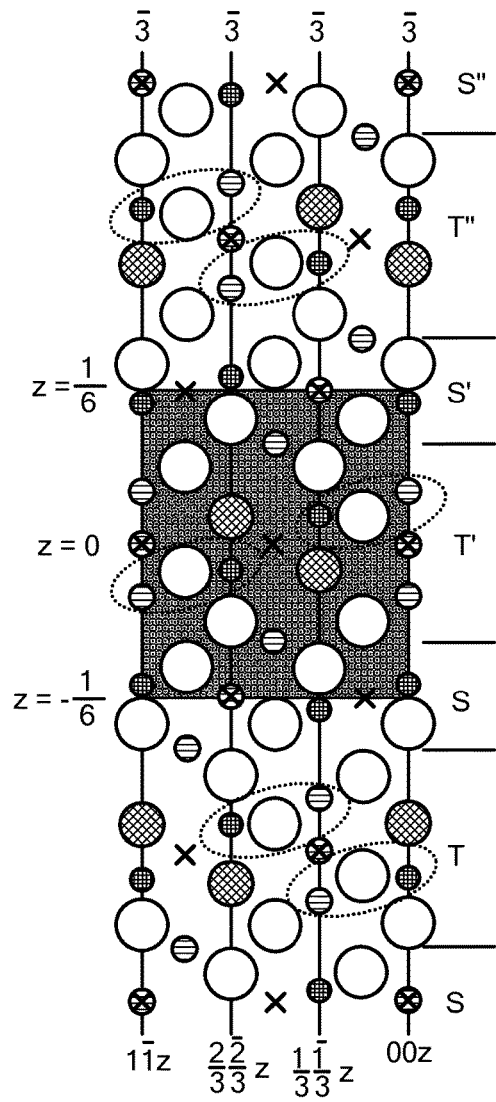
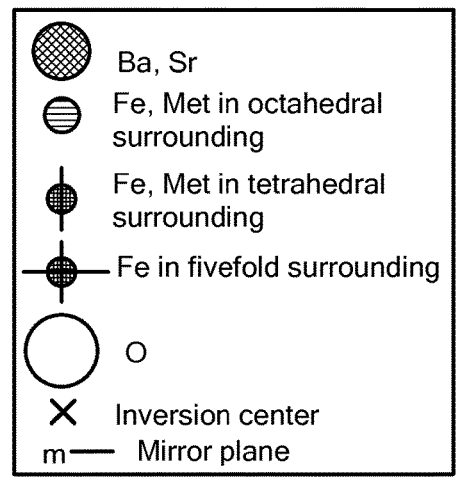
FIG. 1B

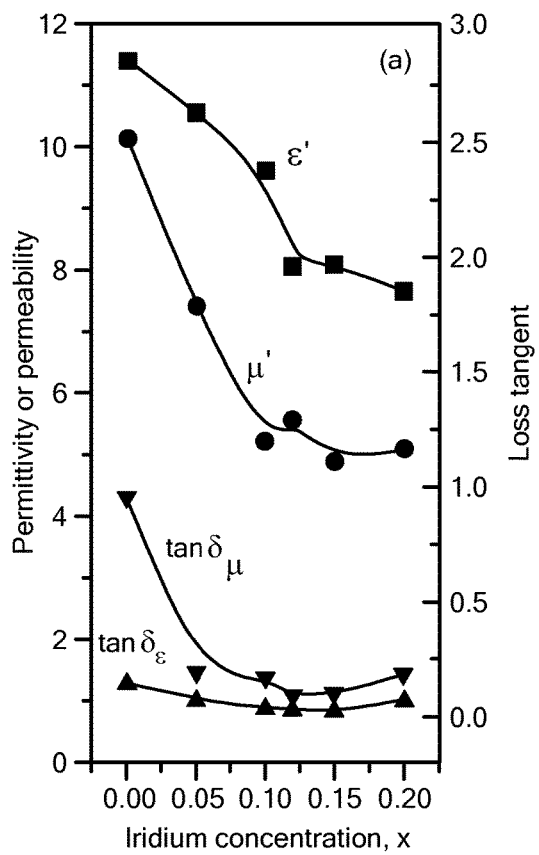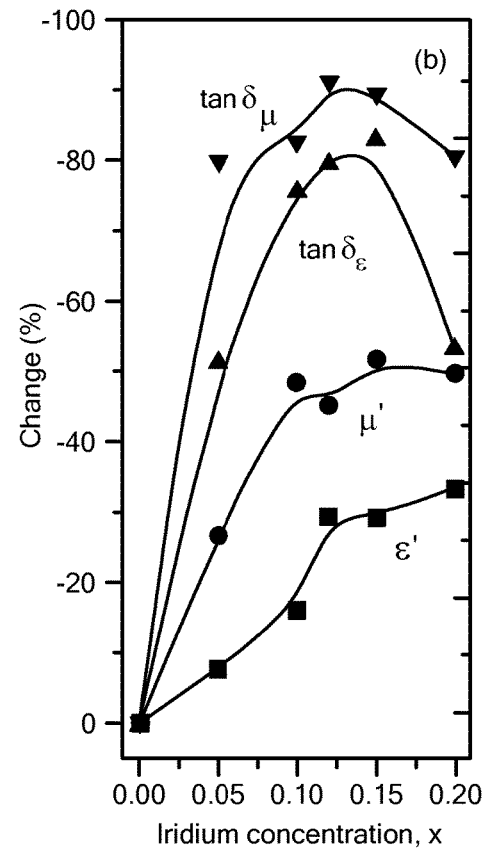
*FIG. 6A*  *FIG. 6B*

CO2 Z-TYPE FERRITE COMPOSITE MATERIAL FOR USE IN ULTRA-HIGH FREQUENCY ANTENNAS

CROSS REFERENCE TO RELATED APPLICATIONS

This application claims priority under 35 § 119(e) of U.S. Provisional Application No. 62/031,369 filed on Jul. 31, 2014, entitled "Low loss factor Co2Z ferrite composites with identical permittivity and permeability for ultra-high frequency applications (0.3-1 GHz)," the disclosure of which is hereby incorporated by reference.

STATEMENT REGARDING FEDERALLY SPONSORED RESEARCH OR DEVELOPMENT

N/A

BACKGROUND

Improved performance and miniaturization are needed to meet the ever-increasing demands of devices used in ultra-high frequency (UHF), L-band, and S-band applications, which are of particular interest in a variety of commercial and defense related industries. As a critical component in radar and modern wireless communication systems, antenna elements with compact size are constantly being developed. It has, however, been challenging to develop ferrite materials for use in such high frequency applications. Known ferrite materials exhibit relatively high magnetic loss at high frequencies, which has not met the need for the design of a practical antenna.

SUMMARY OF THE INVENTION

The invention relates to a ferrite composition useful as a magnetic material in electrical devices operating in the ultrahigh frequency (UHF) range. The ferrite composition comprises Ba, Co, and Ir, and includes a Z-type hexaferrite phase and a Y-type hexaferrite phase. The invention also relates to methods of making the ferrite composition and parts or devices that comprise the ferrite composition.

Other aspects of the invention include the following:
1. A ferrite composition comprising Ba, Co, Fe, and Ir, wherein said ferrite composition comprises a Z-type hexaferrite phase and a Y-type hexaferrite phase.
2. The ferrite composition of item 1, having the formula $$Ba_3Co_{(2+x)}Ir_xFe_{(24-2x)}O_{41}$$

where x=0.05-0.20.
3. The ferrite composition of any of items 1-2, wherein x=0.12-0.15.
4. The ferrite composition of any of items 1-3, wherein the Z-type hexaferrite phase ranges from 65 vol. % to 97.5 vol %, and the Y-type hexaferrite phase ranges from 2.5 vol. % to 35 vol. %.
5. The ferrite composition of any of items 1-3, wherein the Z-type hexaferrite phase ranges from 65 vol. % to 97.5 vol %, and the Y-type hexaferrite phase comprises a balance.
6. The ferrite composition of any of items 1-4, further comprising $Bi_2O_3$ ranging from 0.2 to 5.0 wt. %.
7. The ferrite composition of any of items 1-4 and 6, wherein the $Bi_2O_3$ is present at grain boundaries of the Z-type hexaferrite phase and the Y-type hexaferrite phase.
8. The ferrite composition of any of items 1-7, wherein the ferrite composition has a real permittivity ranging from about 7 to about 8.
9. The ferrite composition of any of items 1-8, wherein the ferrite composition has a real permeability ranging from about 7 to about 8.
10. The ferrite composition of any of items 1-9, wherein a real permittivity of the ferrite composition is equal to a real permeability of the ferrite composition within 10%.
11. The ferrite composition of any of items 1-10, wherein the ferrite composition has a characteristic impedance matching an impedance of free space within 3%.
12. The ferrite composition of any of items 1-11, wherein the ferrite composition has a dielectric loss tangent tan $\delta_\in$ ranging from 0.05 to 0.07 over a frequency range of 0.65 to 0.85 GHz.
13. The ferrite composition of any of items 1-12, wherein the ferrite composition has a magnetic loss tangent tan $\delta_\mu$ ranging from 0.07 to 0.29 over a frequency range of 0.65 to 0.85 GHz.
14. The ferrite composition of any of items 1-13, wherein the ferrite composition has a dielectric loss factor tan $\delta_\mu/\in'=0.008\pm20\%$ at a frequency of 0.8 GHz.
15. The ferrite composition of any of items 1-14, wherein the ferrite composition has a magnetic loss factor tan $\delta_\mu/\mu'=0.037\pm10\%$ at a frequency of 0.8 GHz.
16. A part comprising the ferrite composition of any of items 1-15.
17. The part of any of items 1-16, wherein the part is an antenna, filter, inductor, circulator, or phase shifter.
18. The part of any of items 1-17, wherein the part is a microwave antenna.
19. The part of any of items 1-18, wherein the part is an antenna operable at a frequency equal to or greater than 0.1 GHz.
20. The part of any of items 1-19, wherein the part is an antenna operable at a frequency equal to or greater than 0.3 GHz.
21. The part of any of items 1-18, wherein the part is an antenna operable at 0.1 to 1.5 GHz.
22. The part of any of items 1-18 and 21, wherein the part is an antenna operable at 0.3 to 1.0 GHz.
23. A method of making a ferrite composition comprising:
(a) providing hexaferrite phase precursor compounds comprising Fe, Ba, Co, and Ir,
(b) calcining the hexaferrite phase precursor compounds in air to form a material comprising a Z-type hexaferrite phase and a Y-type hexaferrite phase.
24. The method of item 23, wherein the hexaferrite phase precursor compounds comprise oxides of Fe, Ba, Co, and Ir.
25. The method of item 23, wherein the hexaferrite phase precursor compounds comprise $IrO_2$, $BaCO_3$, $Co_3O_4$, and $Fe_2O_3$.
26. The method of item 23, wherein the hexaferrite phase precursor compounds comprise 0.2 to 2 wt. % $IrO_2$, 20-25 wt. % $BaCO_3$, 5-7 wt. % $Co_3O_4$, and 68-74 wt. % $Fe_2O_3$.
27. The method of any of items 23-26, wherein in step (b), the precursor compounds are calcined at 1000 to 1200° C. for 2 to 10 hours.
28. The method of any of items 23-27, further comprising adding $Bi_2O_3$ after step (b).
29. The method of any of items 23-28, wherein the $Bi_2O_3$ ranges from 0.2 to 5.0 wt. %.
30. The method of any of items 23-29, further comprising:
(c) crushing the material formed in step (b) form a powder mixture, and
(d) sintering the powder mixture.

31. The method of any of items 23-30, wherein the powder mixture is sintered at 1250 to 1280° C.
32. The method of any of items 23-31, wherein the powder mixture is sintered for 2 to 10 hours.
33. The method of any of items 23-32, wherein the powder mixture is sintered in an oxygen atmosphere.
34. The method of any of items 23-33, further comprising forming the powder mixture into a compact prior to step (d).
35. The method of any of items 23-34, further comprising adding a binder to the powder mixture.
36. The method of any of items 23-35, wherein the binder is selected from the group consisting of a polyvinyl alcohol, methyl cellulose, polyethylene glycol, and poly(alkylene carbonate).
37. The method of any of items 23-36, wherein the polyvinyl alcohol comprises 8% to 12% by weight of the powder mixture.

DESCRIPTION OF THE DRAWINGS

The invention will be more fully understood from the following detailed description taken in conjunction with the accompanying drawings in which:

FIG. 1A is a schematic crystal structure diagram of an M-type phase hexaferrite;

FIG. 1B is a schematic crystal structure diagram of a Z-type phase hexaferrite;

FIG. 6A is a graph showing real permittivity and permeability of composite ferrites at various iridium concentrations at 0.8 GHz;

FIG. 6B is a graph showing the percentage change in permittivity and permeability and dielectric loss tangent tan $\delta$, and the magnetic loss tangent tan $\delta_\mu$ at various iridium concentrations at 0.8 GHz.

DETAILED DESCRIPTION OF THE INVENTION

This application incorporates by reference the entire disclosure of U.S. Provisional Application No. 62/031,369, filed on Jul. 31, 2014, entitled "Low loss factor Co2Z ferrite composites with identical permittivity and permeability for ultra-high frequency applications (0.3-1 GHz)".

Hexagonal ferrites, or hexaferrites, are a type of iron-oxide ceramic compound that has a hexagonal crystal structure and exhibits magnetic properties. Several types or families of hexaferrites are known, including Z-type ferrites, $Ba_3Me_2Fe_{24}O_{41}$, and Y-type ferrites, $Ba_2Me_2Fe_{12}O_{22}$, where Me can be a small 2+ cation such as Co, Ni, or Zn. Sr can be substituted for Ba. Other hexaferrite types include M-type ferrites ($(Ba,Sr)Fe_{12}O_{19}$), W-type ferrites ($(Ba,Sr)Me_2Fe_{16}O_{27}$), X-type ferrites ($(Ba,Sr)_2Me_2Fe_{28}O_{46}$), and U-type ferrites ($(Ba,Sr)_4Me_2Fe_{36}O_{60}$).

Compared to spinel ferrites with high permeability and low cut-off frequency, some hexaferrites, such as cobalt-substituted barium Y-type ($Co_2Y$) and Z-type ($Co_2Z$) hexaferrites have much higher ferromagnetic resonance frequencies and permeabilities. These magnetic properties make these hexagonal ferrites attractive in high frequency applications and devices, such as antennas, filters, inductors, and circulators. The ultrahigh frequency (UHF) range is 0.3 GHz to 3 GHz. The microwave frequency range is 0.3 GHz to 300 GHz. It has, however, been challenging to design high frequency and microwave devices that have a relative permeability $\mu$ and relative permittivity $\in$ of an equal or substantially equal value as well as low magnetic and dielectric loss tangents (tan $\delta_\mu$, tan $\delta_\in$) and loss factors (tan $\delta_\mu/\mu$, tan $\delta_\in/\in$). (As used herein, the permeability and permittivity values are the relative permeability and the relative permittivity, respectively.)

The present invention relates to a ferrite composition that is suitable for operation in ultrahigh frequency (UHF) and microwave applications. In particular, a ferrite composition is provided containing Ba, Co, and Ir and having a Z-type hexaferrite phase and a Y-type hexaferrite phase. The Y-type phase appears as a secondary phase with the doping of iridium, which helps to reduce the dielectric and magnetic loss. The ferrite composition has the formula:

$$Ba_3Co_{(2+x)}Ir_xFe_{(24-2x)}O_{41}$$

In some embodiments, x=0.05 to 0.2. In other embodiments, x=0.12 to 0.15.

Some properties of the Y-type and Z-type hexaferrites are shown in Table 1.

TABLE 1

|  | $Co_2Y$ | $Co_2Z$ |
|---|---|---|
| Formula | $Ba_2Co_2Fe_{12}O_{22}$ | $Ba_3Co_2Fe_{24}O_{41}$ |
| Stacking Order | $(TS)_3$ | $RSTSR*S*T*S*$ |
| C(Å) | 43.56 | 52.30 |
| $4\pi M_s \cdot G$ | 2300 | 3360 |
| $\mu_i$ | 3-4 | 17 |
| $H_A$(kOe) | 28 | 13 |
| $K_1 + K_2$ | −2.6 | −1.8 |
| $f_r \cdot$ (GHz) | 3 | 1-2 |
| $T_c$ | 340 | 410 |
| $\rho(g/cm^3)$ | 5.4 | 5.35 |

Figure 1C:
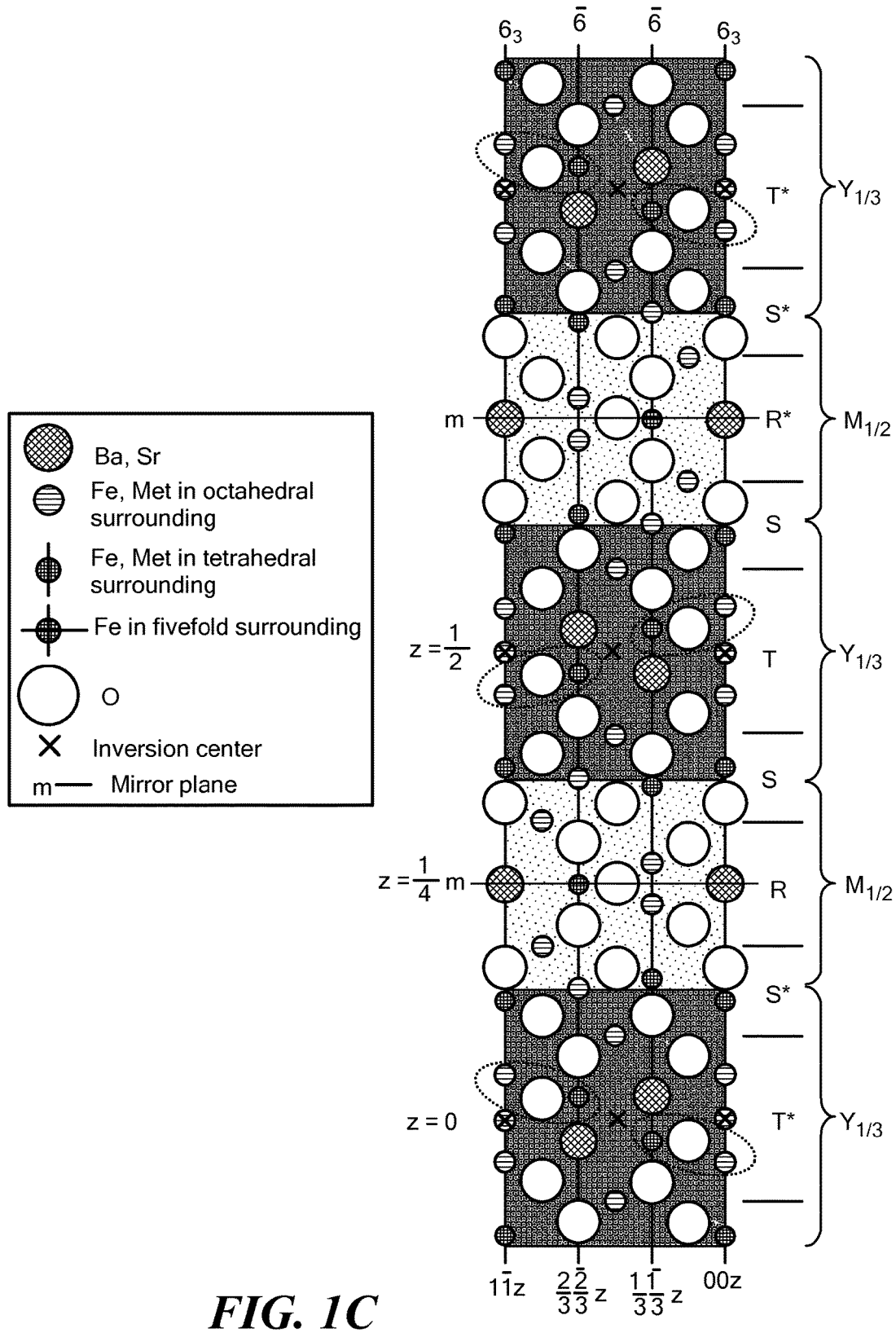
FIG. 1C is a schematic crystal structure diagram of a Y-type phase hexaferrite.

Schematic crystal structure diagrams of M-type phase, Y-type phase, and Z-type phase hexaferrites are illustrated in FIGS. 1A-1C. The ferrite compounds are made of R, S, and T layers or minor modifications of these layers.

Figure 2:
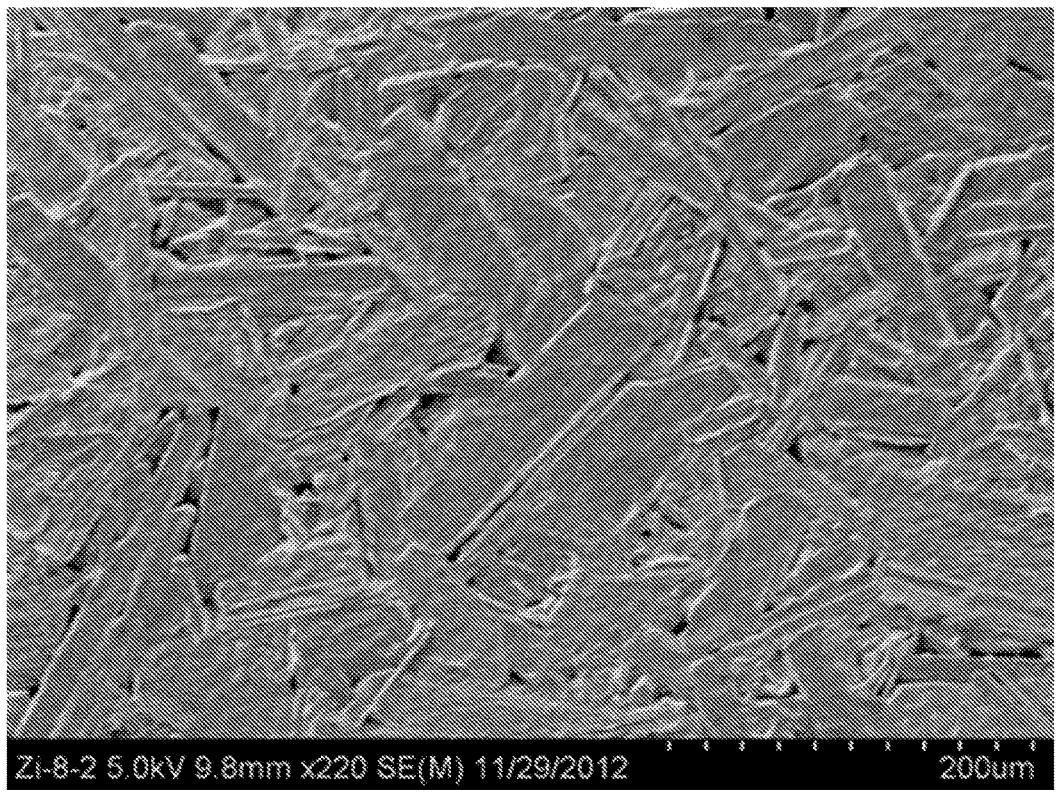
FIG. 2 is a scanning electron micrograph of a ferrite composition according to the present invention.

In some embodiments of the present ferrite composition, the Z-type phase can range from 65% by weight to 97.5% by weight, with the balance being the Y-type phase. In some embodiments, the grain size can ranges from 100 to 200 μm. A photomicrograph of a ferrite composition is illustrated in FIG. 2.

The ferrite composition has a low dielectric loss factor and magnetic loss factor within the UHF range. In some embodiments, the ferrite composition has a dielectric loss factor tan $\delta_\in/\in=0.008\pm20\%$ and a magnetic loss factor tan $\delta_\mu/\mu'=0.037\pm10\%$ at a frequency of 0.8 GHz.

In some embodiments, $Bi_2O_3$ can be added to the ferrite composition. The addition of $Bi_2O_3$, which is present at grain boundaries of the Z-type hexaferrite phase and the Y-type hexaferrite phase, aids in achieving a composition which has equal or substantially equal values of permeability and permittivity while retaining low magnetic and dielectric loss factors. In some embodiment, $Bi_2O_3$ can range from 0.2 to 5.0 wt. %.

In some embodiments, the ferrite composition has a real permittivity ranging from about 7 to about 8, and a real permeability ranging from about 7 to about 8. In one embodiment, the real permittivity is equal to a real permeability of the ferrite composition to within 10%. In other embodiments, the real permittivity and real permeability can be equal to within 15%, within 5%, within 2% or within 1%. The ferrite composition can have a characteristic impedance matching an impedance of free space within 3%. In other embodiments, the characteristic impedance can match the impedance of free space within 5%, within 2% or within 1%.

The ferrite composition can be fabricated in any suitable manner. In one embodiment, the ferrite composition can be fabricated by providing hexaferrite phase precursor compounds including Ir, Ba, and Co. The precursor compounds are calcined in air to form a material comprising a Z-type hexaferrite phase and a Y-type hexaferrite phase. The resulting material can be crushed to form a powder mixture that can be shaped and sintered to form a solid body.

In one exemplary embodiment, a mixture of $IrO_2$, $BaCO_3$, $Co_3O_4$, and $Fe_2O_3$ is provided. Suitable amounts are 0.2 to 2 wt. % $IrO_2$, 20-25 wt. % $BaCO_3$, 5-7 wt. % $Co_3O_4$, and 68-74 wt. % $Fe_2O_3$. The mixture is calcined in air to form the Z-type and Y-type hexaferrite phases. The resulting material is crushed and ball milled to form a powder mixture. $Bi_2O_3$, ranging from 0.2 to 5.0 wt. %, can be added to the powder mixture after the calcination step. The powder mixture is formed into a compact, with the addition of a binder to assist in maintaining the compact shape. Suitable binders include polyvinyl alcohol, methyl cellulose, polyethylene glycol, or poly(alkylene carbonate). The binder can range from 8 to 12% by weight of the powder mixture. The binder burns off during subsequent sintering.

The compact is sintered for a suitable time at a suitable temperature. In some embodiments, the compact can be sintered at 1250 to 1280° C. In some embodiments, the compact can be sintered for 2 to 10 hours. The compact can be sintered in an oxygen atmosphere to help decrease dielectric loss. For example, $O_2$ gas can flow in at a rate of 0.5 to 2 l/m.

The sintered part can be finished in any desired manner, such as by cutting and polishing, depending on the application.

In other embodiments, the powder mixture can be formed by mechanisms such as tape casting or additive manufacturing prior to sintering.

The ferrite composition can be used for a variety of devices operable within the UHF range, such as a high frequency or microwave antenna, filter, inductor, circulator, or phase shifter. In some embodiments, the device can be operable at frequencies greater than 0.1 GHz and in other embodiments at frequencies greater than 0.3 GHz. The device can be operable over a frequency range of 0.1 to 1.5 GHz. In other embodiments, the device can be operable over a frequency range of 0.3 to 1.0 GHz. Such devices can be used in commercial and military applications, weather radar, scientific communications, mobile and wireless communications, autonomous vehicles, aircraft communications, space communications, satellite communications, and surveillance.

Example 1

Polycrystalline $Co_2Z$ ferrites, having the composition $Ba_3Co_{2+x}Ir_xFe_{24-2x}O_{41}$, where x=0, 0.05, 0.10, 0.15 and 0.20, were prepared by a ceramic process. Starting materials of $BaCO_3$, $IrO_2$, $Co_3O_4$, and $Fe_2O_3$ were calcined in air for 6 hours at 1000° C. to form the ferrite phases, and then crushed and ball milled. A mixture was prepared comprising 90 vol. % ferrite fine powders and 10 vol. % polyvinyl alcohol (PVA) binder, and was pressed into a toroid with an outer diameter of 7 mm, inner diameter of 3 mm, and width of about 2 mm. This sample size is adequate for microwave measurements. The ferrite samples were sintered at 1250-1280° C. for 4 hours in an oxygen atmosphere.

X-ray diffraction (XRD) characterization of the crystallographic structure of the resulting ferrite compositions revealed a Z-type phase accompanied by increasing amounts of Y-type phase as the iridium amount was increased. The Y-type phase appeared as a secondary phase with the doping of iridium and helped to reduce the dielectric and magnetic loss. The measured microwave dielectric and magnetic properties showed that the loss tan $\delta_\epsilon$ and loss tan $\delta_\mu$ decreased by 80% and 90% at 0.8 GHz with the addition of iridium having x=0.12-0.15, respectively.

The crystallographic structure was determined by X-ray diffraction measurements, using a Philips X'pert PRO diffractometer, at room temperature in a 0-20 geometry using CuKα radiation. The complex permittivity and permeability spectra were measured over a frequency range from 0.3-1 GHz with an Agilent E864A 45 MHz-50 GHz PNA series network analyzer and a 7 mm HP 85050C precision airline.

Figure 3:
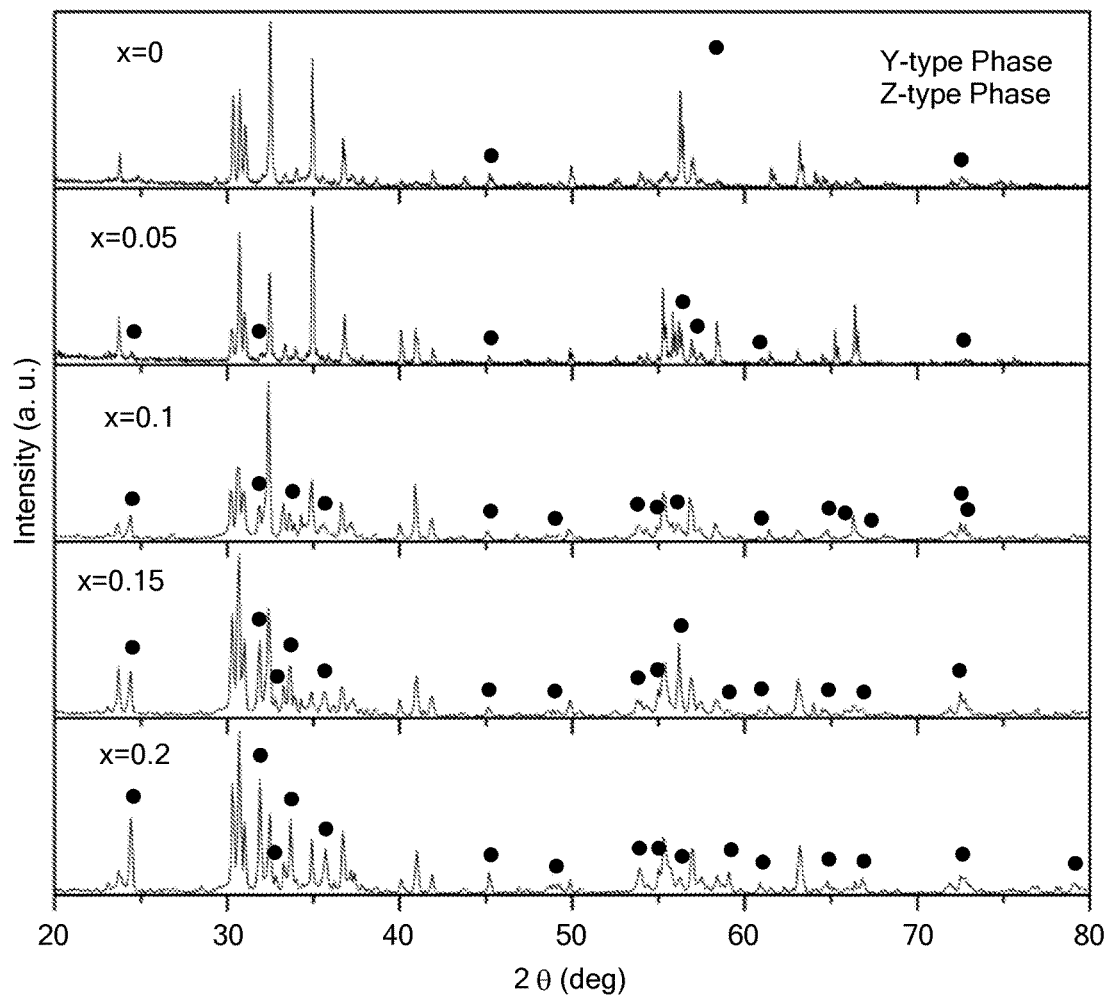
FIG. 3 is a graph illustrating X-ray diffraction patterns of composite ferrite samples at various iridium concentrations (x)
Figure 4:
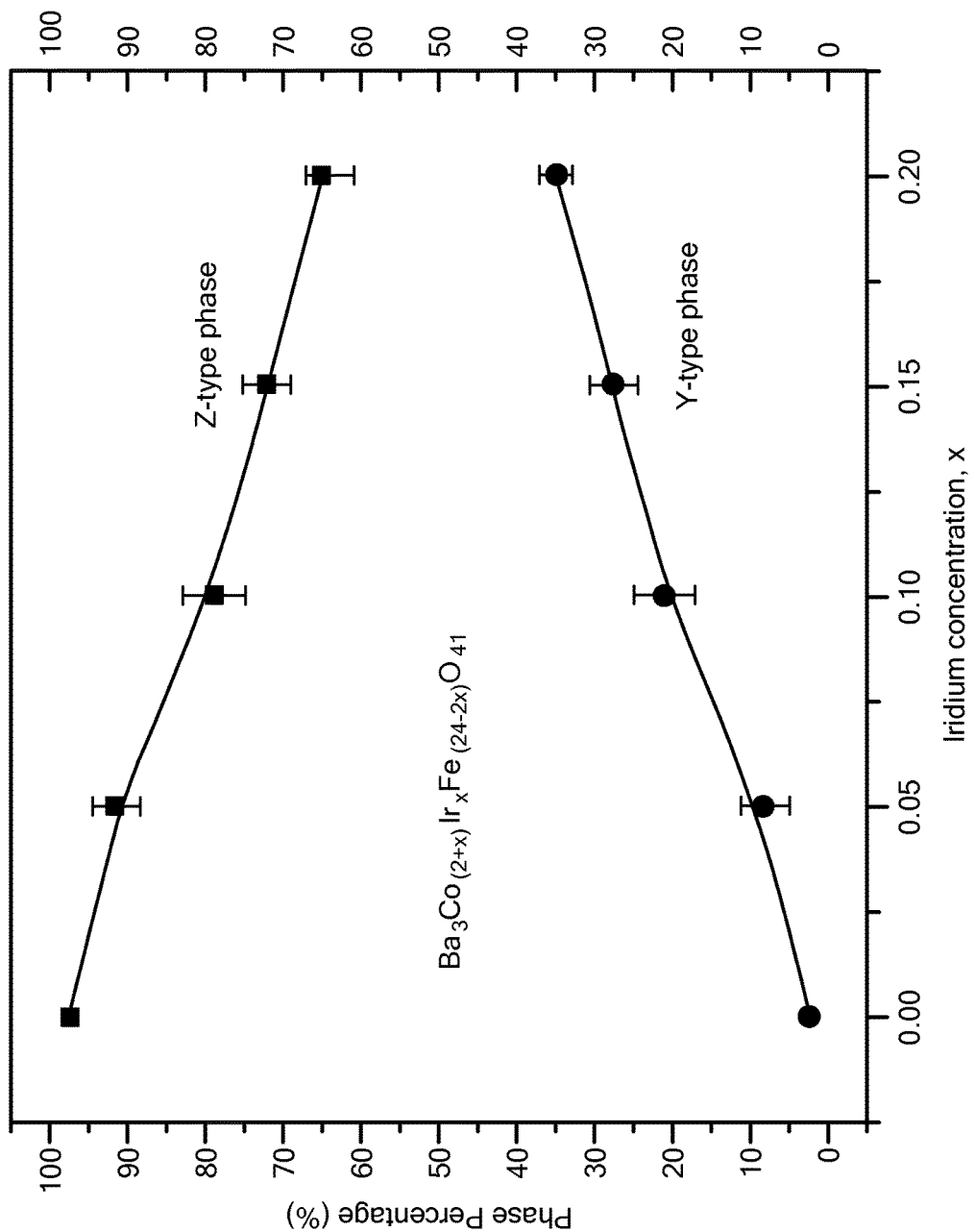
FIG. 4 is a graph illustrating the phase percentage of Z-type and Y-type phases at various iridium concentrations (x)

Referring to FIG. 3, all of the diffraction lines were indexed to either Z-type or Y-type hexaferrite crystallographic phases. In FIG. 3, the Z-type phase is indicated by a solid line and the Y-type phase is indicated by dots at the peaks. The Z-type phase is the dominant phase when heat-treated at temperatures higher than 1200° C. The iridium amount is indicated by x=0, 0.05, 0.1, 0.15, and 0.2. As can be seen in FIG. 3, when no iridium is present, x=0, the result shows an almost pure Z-type phase with a small amount of Y-type phase. With an increase in iridium, not only does the amount of Y-type peaks increase, but also the peak intensities can be seen to increase. The amount of Z-type and Y-type phases was calculated based on XRD data and the percentages are shown in FIG. 4. The weight percentage of Z-type phase decreased from 97.5% to 65.1% with the amount of iridium, x, increasing to 0.2. It can be seen that the doping with iridium changes the crystal structure from a quasi-single phase to a two phase system.

Figure 5:
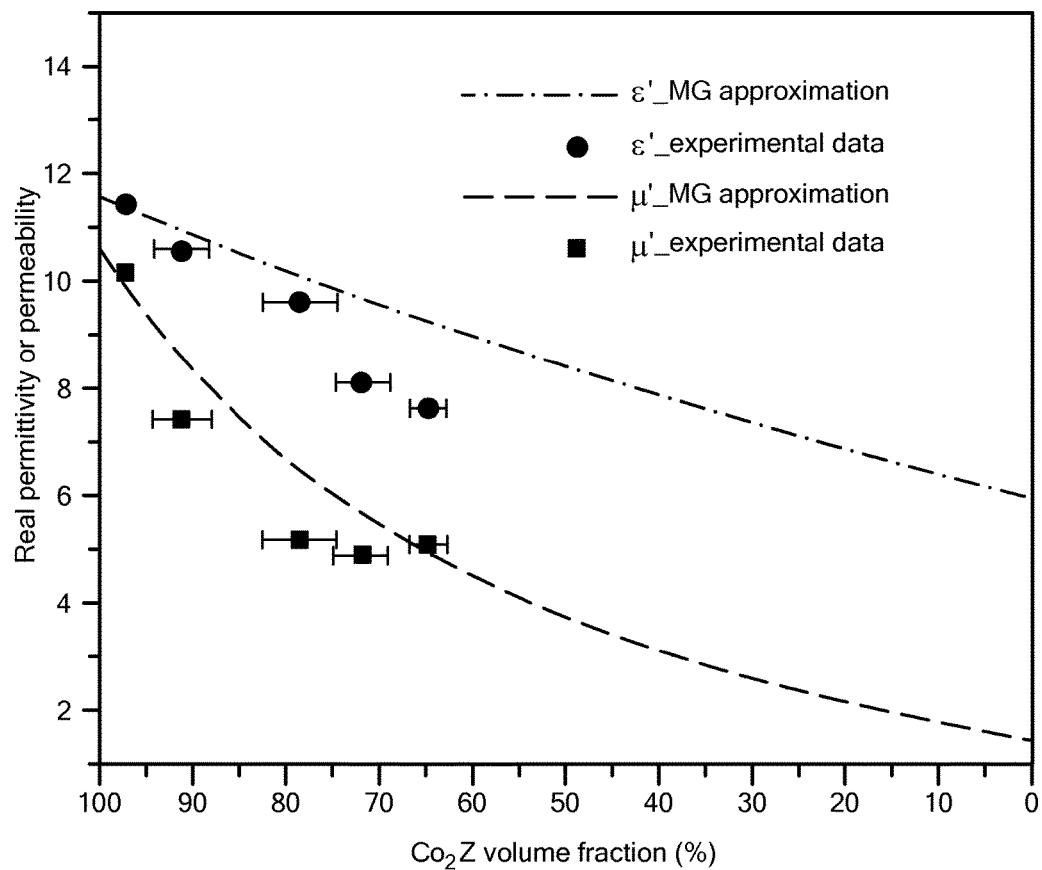
FIG. 5 is a graph of real permittivity and permeability at various $Co_2Z$ volume fractions showing calculated approximations and experimental data.
Figure 7:
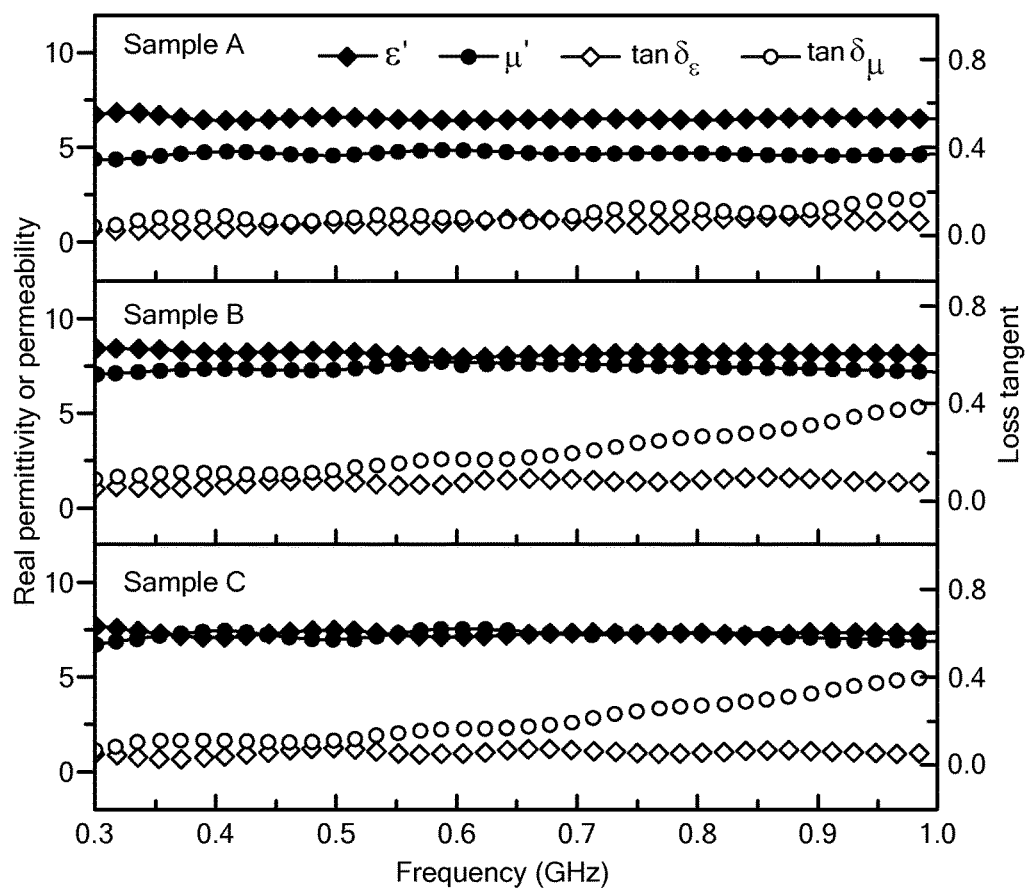
FIG. 7 is a graph of real permittivity and real permeability and dielectric and magnetic loss tangents for three samples, Samples A, B, and C, over 0.3 to 1.0 GHz.

To investigate the effect upon the microwave properties of the composite ferrites, an effective medium approximation was used. The most common theories are Maxwell-Garnet (MG) and Bruggeman equations. The MG model is generally expected to be valid for small or high filling factors, while in the Bruggeman model the two phases contribute equally. Thus the Bruggeman model is often used for moderate filling factors. In the present case, the Z-type phase is dominant and thus the MG approximation is applied. Assuming that the composite ferrites are comprised of spherical inclusions with random distribution, the effective permittivity $\epsilon_e$ and permeability $\mu_e$ of the ferrite composition are given by:

$$\epsilon_e = \epsilon_Y + 3p\epsilon_Z \frac{\epsilon_Z - \epsilon_Y}{\epsilon_Z + 2\epsilon_Y - p(\epsilon_Z - \epsilon_Y)} \quad (1)$$

$$\mu_e = \mu_Y + 3p\mu_Z \frac{\mu_Z - \mu_Y}{\mu_Z + 2\mu_Y - p(\mu_Z - \mu_Y)} \quad (2)$$

where $\varepsilon_Z$, $\varepsilon_Y$, $\mu_Y$ and $\mu_Z$ are the relative permittivity and relative permeability of Z-type and Y-type phase, respectively, and p is the volume fraction of Z-type phase. The real part of the effective permittivity and permeability of the ferrite compositions with variation of volume fraction is shown in FIG. 5. The dot and square symbols represent the experimental data and the dashed lines are the best fit results from applying Equations (1) and (2). Since Y-type and Z-type ferrites possess nearly the same bulk density, ~5.3 g/cm$^3$, the calculated phase percentage in weight can be easily converted into a volume fraction, which is shown along the x axis of FIG. 3. The relationship between experiment and theory are in good agreement using the MG approximation.

Values of real permittivity and real permeability of composite ferrites affected by doping with Iridium at 0.8 GHz are shown in FIG. 6A. The four curves in FIG. 6A represent real permittivity, real permeability, dielectric loss and magnetic loss. For lightly doped samples, the four parameters deceased significantly. With further increases in Iridium content, these parameters decrease more slowly. The values of loss tan $\delta_z$ and loss tan $\delta_\mu$ meet their minimum at x=0.12 and then increase, which can be seen in FIG. 6B. The percentage change in parameters with various iridium amounts is shown in FIG. 6B. The loss tan $\delta_z$ and loss tan $\delta_\mu$ values decreased 80% and 90%, for iridium amounts x=0.12 and 0.15, respectively, while the real permittivity and real permeability decreased 30% and 50%, respectively. The decrease of dielectric and magnetic loss is nearly twice as much as that of the real permittivity and permeability.

Example 2

The effect of the additive Bi$_2$O$_3$ upon the real and complex permittivity and permeability of the composite ferrites was also examined. Samples labeled A, B and C with various amounts of Bi$_2$O$_3$ (ranging from 0.2 to 5.0 wt. %) and iridium amounts (x=0.12-0.15) were prepared for microwave measurements. The amounts of Bi$_2$O$_3$ and Ir are indicated in Table 2.

TABLE 2

| | A | B | C |
|---|---|---|---|
| Bi$_2$O$_3$ | 2-5 wt. % | 0.5-3 wt. % | 0.1-1.0 wt. % |
| Ir | x = 0.12-0.20 | x = 0.08-0.15 | x = 0.12-0.20 |

FIG. 5 shows the relative real permittivity $\varepsilon'$ and real permeability $\mu'$ spectrum and dielectric and magnetic loss of the three samples in the frequency range from 0.3 GHz to 1 GHz. The values of real permittivity $\varepsilon'$ are very close to those of the real permeability $\mu'$ for all three samples. Sample C shows the best performance in impedance match to free space with almost equal values of real permittivity $\varepsilon'$ and real permeability $\mu'$. As for the dielectric and magnetic loss, all three samples have relatively lower loss tan $\delta_\varepsilon$ and loss tan $\delta_\mu$ at frequencies from 0.5 GHz to 0.9 GHz compared with reported data of barium Z-type ferrites (for example, a magnetic loss tan $\delta_\mu$ of 0.5-1.0 at 0.8 GHz). Sample A shows lower magnetic loss than samples B and C in the high frequency range of 0.6-1.0 GHz. The detailed results of real permittivity $\varepsilon'$, real permeability $\mu'$, loss tan $\delta_\varepsilon$ and loss tan $\delta_\mu$, and loss factors tan $\delta_\varepsilon/\varepsilon'$ and tan $\delta_\mu/\mu'$ at five different frequencies are summarized in Table 3. It is found that the values of $\mu'/\varepsilon'$ are substantially equal to 1.0 over the frequency range from 0.65 GHz to 0.85 GHz for sample C, indicating that the characteristic impedance is the same as that of free space impedance. The loss tan $\delta_\varepsilon$ of all the samples over the whole frequency range remains low, around 0.07, ranging from 0.05 to 0.09 over the frequency range 0.65 to 0.85 GHz. The loss tan $\delta_\mu$ increases from 0.07 to 0.29 with frequency from 0.65 GHz to 0.85 GHz. This is the result of the frequency approaching that of the FMR frequencies of the samples. Furthermore, the loss factors (tan $\delta_\varepsilon/\varepsilon'$ and tan $\delta_\mu/\mu'$) are also calculated to be 0.008 and 0.037 at 0.8 GHz, respectively, in order to make comprehensive performance evaluation of the ferrite materials. As shown above, both magnetic loss, 0.27 at 0.8 GHz, and loss factor, 0.037 at 0.8 GHz of the present ferrite compositions represent the lowest values among those reported ferrites at UHF.

TABLE 3

$\varepsilon'$, $\mu'$, tan $\delta_\varepsilon$, tan $\delta_\mu$, and loss tan $\delta_\varepsilon$ and loss tan $\delta_\mu$ of sample A, B and C at five different frequencies

| Sample name | | A | B | C |
|---|---|---|---|---|
| 0.65 GHz | $\varepsilon'$ | 6.48 | 8.01 | 7.25 |
| | $\mu'$ | 4.73 | 7.59 | 7.37 |
| | tan$\delta_\varepsilon$ | 0.08 | 0.07 | 0.07 |
| | tan$\delta_\mu$ | 0.07 | 0.16 | 0.17 |
| | tan$\delta_\varepsilon/\varepsilon'$ | 0.012 | 0.009 | 0.010 |
| | tan$\delta_\mu/\mu'$ | 0.015 | 0.021 | 0.023 |
| 0.70 GHz | $\varepsilon'$ | 6.56 | 8.09 | 7.36 |
| | $\mu'$ | 4.64 | 7.54 | 7.29 |
| | tan$\delta_\varepsilon$ | 0.07 | 0.07 | 0.07 |
| | tan$\delta_\mu$ | 0.09 | 0.19 | 0.20 |
| | tan$\delta_\varepsilon/\varepsilon'$ | 0.011 | 0.009 | 0.010 |
| | tan$\delta_\mu/\mu'$ | 0.019 | 0.025 | 0.027 |
| 0.75 GHz | $\varepsilon'$ | 6.52 | 8.12 | 7.29 |
| | $\mu'$ | 4.69 | 7.49 | 7.33 |
| | tan$\delta_\varepsilon$ | 0.05 | 0.06 | 0.05 |
| | tan$\delta_\mu$ | 0.13 | 0.22 | 0.24 |
| | tan$\delta_\varepsilon/\varepsilon'$ | 0.008 | 0.007 | 0.007 |
| | tan$\delta_\mu/\mu'$ | 0.028 | 0.029 | 0.033 |
| 0.80 GHz | $\varepsilon'$ | 6.52 | 8.14 | 7.24 |
| | $\mu'$ | 4.70 | 7.44 | 7.34 |
| | tan$\delta_\varepsilon$ | 0.07 | 0.07 | 0.06 |
| | tan$\delta_\mu$ | 0.12 | 0.25 | 0.27 |
| | tan$\delta_\varepsilon/\varepsilon'$ | 0.011 | 0.009 | 0.008 |
| | tan$\delta_\mu/\mu'$ | 0.026 | 0.033 | 0.037 |
| 0.85 GHz | $\varepsilon'$ | 6.58 | 8.16 | 7.29 |
| | $\mu'$ | 4.64 | 7.37 | 7.22 |
| | tan$\delta_\varepsilon$ | 0.09 | 0.08 | 0.07 |
| | tan$\delta_\mu$ | 0.10 | 0.27 | 0.29 |
| | tan$\delta_\varepsilon/\varepsilon'$ | 0.014 | 0.010 | 0.010 |
| | tan$\delta_\mu/\mu'$ | 0.022 | 0.037 | 0.040 |

It will be appreciated that the various features of the embodiments described herein can be combined in a variety of ways. For example, a feature described in conjunction with one embodiment may be included in another embodiment even if not explicitly described in conjunction with that embodiment.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A ferrite composition comprising Ba, Co, Fe, and Ir, wherein said ferrite composition comprises a composite of grains of a Z-type hexaferrite phase and grains of a Y-type hexaferrite phase; wherein the Z-type hexaferrite phase has the formula $Ba_3Co_{(2+x)}Ir_xFe_{(24-2x)}O_{41}$
where x=0.05-0.20.

2. The ferrite composition of claim 1, wherein x=0.12-0.15.

3. The ferrite composition of claim 1, wherein the Z-type hexaferrite phase ranges from 65 vol. % to 97.5 vol %, and the Y-type hexaferrite phase ranges from 2.5 vol. % to 35 vol. %.

4. The ferrite composition of claim 1, wherein the Z-type hexaferrite phase ranges from 65 vol. % to 97.5 vol %, and the Y-type hexaferrite phase comprises a balance.

5. The ferrite composition of claim 1, further comprising $Bi_2O_3$ ranging from 0.2 to 5.0 wt. %.

6. The ferrite composition of claim 5, wherein the $Bi_2O_3$ is present at grain boundaries of the Z-type hexaferrite phase and the Y-type hexaferrite phase.

7. The ferrite composition of claim 1, wherein the ferrite composition has a real permittivity ranging from about 7 to about 8.

8. The ferrite composition of claim 1, wherein the ferrite composition has a real permeability ranging from about 7 to about 8.

9. The ferrite composition of claim 1, wherein a real permittivity of the ferrite composition is equal to a real permeability of the ferrite composition within 10%.

10. The ferrite composition of claim 1, wherein the ferrite composition has a characteristic impedance matching an impedance of free space within 3%.

11. The ferrite composition of claim 1, wherein the ferrite composition has a dielectric loss tangent $\tan \delta_\epsilon$ ranging from 0.05 to 0.07 over a frequency range of 0.65 to 0.85 GHz.

12. The ferrite composition of claim 1, wherein the ferrite composition has a magnetic loss tangent $\tan \delta_\mu$ ranging from 0.07 to 0.29 over a frequency range of 0.65 to 0.85 GHz.

13. The ferrite composition of claim 1, wherein the ferrite composition has a dielectric loss factor $\tan \delta_\epsilon/\epsilon' = 0.008 \pm 20\%$ at a frequency of 0.8 GHz.

14. The ferrite composition of claim 1, wherein the ferrite composition has a magnetic loss factor $\tan \delta_\mu/\mu' = 0.037 \pm 10\%$ at a frequency of 0.8 GHz.

15. A part comprising the ferrite composition of claim 1, wherein the part is an antenna, microwave antenna, filter, inductor, circulator, or phase shifter.

16. A method of making a ferrite composition comprising:
(a) providing hexaferrite phase precursor compounds comprising Fe, Ba, Co, and Ir,
(b) calcining the hexaferrite phase precursor compounds in air to form a material comprising a composite of grains of a Z-type hexaferrite phase and grains of a Y-type hexaferrite phase;
wherein the Z-type hexaferrite phase has the formula
$Ba_3Co_{(2+x)}Ir_xFe_{(24-2x)}O_{41}$
where x=0.05-0.20.

17. The method of claim 16, wherein the hexaferrite phase precursor compounds comprise oxides of Fe, Ba, Co, and Ir.

18. The method of claim 16, wherein the hexaferrite phase precursor compounds comprise 0.2 to 2 wt. % $IrO_2$, 20-25 wt. % $BaCO_3$, 5-7 wt. % $Co_3O_4$, and 68-74 wt. % $Fe_2O_3$.

19. The method of claim 16, wherein in step (b), the precursor compounds are calcined at 1000 to 1200° C. for 2 to 10 hours, and further comprising
(c) crushing the material formed in step (b) to form a powder mixture and forming the powder mixture into a compact; and
(d) sintering the powder mixture at 1250 to 1280° C. for 2 to 10 hours in an oxygen atmosphere.

20. The method of claim 16, further comprising adding $Bi_2O_3$ after step (b), the $Bi_2O_3$ ranging from 0.2 to 5.0 wt. %.

21. The method of claim 19, further comprising adding a binder to the powder mixture, wherein the binder is selected from the group consisting of a polyvinyl alcohol, methyl cellulose, polyethylene glycol, and poly(alkylene carbonate).

22. The method of claim 21, wherein the powder mixture comprises 8% to 12% by weight of the polyvinyl alcohol.

* * * * *